(12) United States Patent
Holtz et al.

(10) Patent No.: US 9,506,614 B2
(45) Date of Patent: Nov. 29, 2016

(54) HEADLIGHT LENS FOR A MOTOR VEHICLE HEADLIGHT

(75) Inventors: Steffen Holtz, Jena (DE); Bernhard Breeger, Kleineutersdorf (DE)

(73) Assignee: Docter Optics GmbH, Neustadt an der Orla (DE)

( * ) Notice: Subject to any disclaimer, the term of this patent is extended or adjusted under 35 U.S.C. 154(b) by 1708 days.

(21) Appl. No.: 11/991,134

(22) PCT Filed: Aug. 18, 2006

(86) PCT No.: PCT/EP2006/008137
§ 371 (c)(1),
(2), (4) Date: Jul. 22, 2009

(87) PCT Pub. No.: WO2007/031170
PCT Pub. Date: Mar. 22, 2007

(65) Prior Publication Data
US 2009/0296420 A1    Dec. 3, 2009

(30) Foreign Application Priority Data

Sep. 13, 2005  (DE) .................. 10 2005 043 819

(51) Int. Cl.
*F21S 8/10* (2006.01)
*B60Q 1/04* (2006.01)
*G02B 3/00* (2006.01)

(52) U.S. Cl.
CPC ............. *F21S 48/1258* (2013.01); *B60Q 1/04* (2013.01); *F21S 48/1233* (2013.01); *G02B 3/00* (2013.01); *C03B 2215/49* (2013.01)

(58) Field of Classification Search
CPC ....... G02B 1/00; G02B 3/00; F21S 48/1216; F21S 48/1233; F21S 48/125; F21S 48/1258; B60Q 1/04; G03B 2215/49

USPC ........ 362/459, 487, 507, 520, 509, 538, 539
See application file for complete search history.

(56) References Cited

U.S. PATENT DOCUMENTS 1,604,688 A * 10/1926 Godley ............... F21S 48/1216
362/374
2,037,826 A *  4/1936 Sandberg ................. 340/815.69

(Continued)

FOREIGN PATENT DOCUMENTS

DE    27 55 432    8/1978
DE    100 43 065    3/2002

(Continued)

OTHER PUBLICATIONS

International Preliminary Report on Patentability dated Jul. 17, 2008, International Application No. PCT/EP2006/008137 filed Aug. 18, 2006.

*Primary Examiner* — Stephen F Husar
(74) *Attorney, Agent, or Firm* — Barnes & Thornburg LLP

(57) ABSTRACT

The invention relates to a headlight lens (2, 2B, 2C, 2D, 2E, 2F) for a vehicle headlight (1) comprising a light source (10), in particular for a motor vehicle headlight, the headlight lens (2, 2B, 2C, 2D, 2E, 2F) comprising a lens body (3, 3B, 3C, 3D, 3E, 3F) composed of a transparent material which is moulded (blank-pressed) on both sides and which comprises an optically active surface (5, 5B, 5C, 5D, 5E, 5F), that is to face the light source (10) and an optically active surface (4, 4B, 4C, 4D, 4E, 4F) that faces away from the light source (10), the optically active surface (4, 4B, 4C, 4D, 4E, 4F) that faces away from the light source (10) being convexly curved, the optically active surface (5, 5B, 5C, 5D, 5E, 5F) that is to face the light source (10) being curved, and the headlight lens (2, 2B, 2C, 2D, 2E, 2F) comprising a lens rim (6, 6B, 6C, 6D, 6E, 6F) externally on the optically active surface (5, 5B, 5C, 5D, 5E, 5F) that is to face the light source (10), the volume of which lens rim (6, 6B, 6C, 6D, 6E, 6F) amounts to 1% to 8% of the volume of the headlight lens (2, 2B, 2C, 2D, 2E, 2F).

16 Claims, 7 Drawing Sheets

(56) References Cited

U.S. PATENT DOCUMENTS

| | | | |
|---|---|---|---|
| 4,208,364 A * | 6/1980 | Shepherd | 264/2.2 |
| 4,685,036 A * | 8/1987 | Loewe et al. | 362/546 |
| 4,792,717 A * | 12/1988 | Ferenc | 313/113 |
| 5,713,975 A | 2/1998 | Schonfeld et al. | |
| 6,220,736 B1 * | 4/2001 | Dobler et al. | 362/539 |
| 6,469,844 B1 | 10/2002 | Iwase et al. | |
| 6,520,659 B2 * | 2/2003 | Nishiyama et al. | 362/96 |
| 6,644,840 B2 * | 11/2003 | Yagi et al. | 362/510 |
| 6,746,143 B1 * | 6/2004 | Van Duyn | 362/539 |
| 2003/0012030 A1 * | 1/2003 | Koshiro et al. | 362/520 |
| 2003/0174509 A1 | 9/2003 | Futami | |
| 2004/0090790 A1 * | 5/2004 | Ishida et al. | 362/507 |
| 2005/0036333 A1 * | 2/2005 | Van Duyn | 362/539 |
| 2005/0053788 A1 * | 3/2005 | Terashima | C03B 11/08 428/411.1 |
| 2005/0122734 A1 * | 6/2005 | Foust et al. | 362/539 |
| 2005/0213032 A1 * | 9/2005 | Delery et al. | 351/178 |
| 2006/0072208 A1 | 4/2006 | Bonitz et al. | |
| 2007/0001328 A1 * | 1/2007 | Kelly | 264/1.32 |
| 2007/0268717 A1 * | 11/2007 | Iwasaki | 362/539 |
| 2008/0042307 A1 * | 2/2008 | Ueno et al. | 264/2.5 |
| 2008/0170396 A1 * | 7/2008 | Yuan et al. | 362/244 |
| 2011/0013399 A1 * | 1/2011 | Hu | 362/294 |

FOREIGN PATENT DOCUMENTS

| | | |
|---|---|---|
| DE | 103 48 947 | 5/2005 |
| EP | 0 308 010 | 3/1989 |
| FR | 2 415 607 | 8/1979 |
| GB | 2 391 229 | 2/2004 |
| JP | 59 157603 | 9/1984 |
| JP | 59 177506 | 10/1984 |
| JP | 09208240 | 2/1997 |
| WO | WO 03/087893 | 10/2003 |

* cited by examiner

HEADLIGHT LENS FOR A MOTOR VEHICLE HEADLIGHT

FIELD OF THE INVENTION

The invention relates to a headlight lens for a vehicle headlight, in particular for a motor vehicle headlight, and also a vehicle headlight.

BACKGROUND INFORMATION

An aforementioned headlight lens is known e.g. from WO 02/31543 A1, WO 03/074251 A1 and DE 100 52 653 A1. Further vehicle headlights are known e.g. from DE 100 33 766 A1, DE 101 18 687 A1, US 2003/0174509 A1 and DE 198 29 586 A1.

The published German Patent Application 27 55 432 discloses a luminaire comprising a concave mirror reflector having a light exit opening at least on one side of its optical axis, such that the light beams emerging directly from the luminous element are partly collected by the concave mirror reflector to form a main light bundle and partly exit through the light exit opening, the light exit opening being arranged in a horizontal plane which includes the light centroid of the luminous element, a converging lens of a lens incandescent lamp being arranged before the luminous element, and a concave cylindrical lens that is divergent in only two opposite directions lying in the horizontal plane being arranged before the converging lens of said lens incandescent lamp.

DE 203 20 546 U1 and WO 03/087893 A1 disclose a lens moulded (blank-pressed) on both sides and having a curved surface, having a plane surface and having a holding edge integrally formed on the lens rim, wherein a bearing edge which is at least 0.2 mm thick and projects relative to the plane surface is integrally formed on the holding edge. In this case, the bearing edge is integrally formed on the outer periphery of the lens.

JP 59177506 A discloses a lens with an edge having a surface that projects beyond an edge of an optically active surface.

It is an object of the invention to produce a vehicle headlight and a headlight lens for a vehicle headlight cost-effectively with high optical quality. It is a further object of the invention to improve the optical properties of a vehicle headlight. It is a further object of the invention to improve the imaging of a bright-dark boundary.

SUMMARY OF THE INVENTION

The aforementioned objects are achieved by means of a headlight lens for a vehicle headlight comprising a light source, in particular for a motor vehicle headlight, the headlight lens comprising a lens body composed of a transparent material which is moulded (blank-pressed) on both sides and which comprises an optically active surface that is to face the light source and an optically active surface that faces away from the light source, the optically active surface that faces away from the light source being convexly curved, the optically active surface that is to face the light source being curved, in particular convexly or concavely, and the headlight lens comprising a lens rim externally on the optically active surface that is to face the light source, the volume of which lens rim amounts to 1% to 8% of the volume of the headlight lens.

An optically active surface is to be understood within the meaning of the invention to be in particular a desired "useful surface". An optically active surface is to be understood within the meaning of the invention to be in particular that part of a surface of the headlight lens by means of which the desired optical effect is obtained during use as intended.

The optically active surface that is to face the light source should be regarded as curved within the meaning of the invention in particular when the ratio of a distance—parallel to the optical axis of the headlight lens—between a position at the edge of the optically active surface that is to face the light source, between the edge of the optically active surface that is to face the light source or between a substantial part of the edge of the optically active surface that is to face the light source and the midpoint of the optically active surface that is to face the light source or the (virtual) point of intersection between the optically active surface that is to face the light source and the optical axis of the headlight lens to the diameter of the optically active surface that is to face the light source, in particular with respect to a continuous or at least substantially continuous course of the optically active surface that is to face the light source, amounts to at least 0.01, in particular at least 0.02.

In a further configuration of the invention, the proportion of the volume of the headlight lens made up by the volume of the lens rim amounts to 2% to 6%, in particular approximately 3%.

In one configuration of the invention, the optically active surface that is to face the light source and/or the optically active surface that faces away from the light source is round, in particular circular or substantially circular.

In a further configuration of the invention, a diameter of the optically active surface that is to face the light source is less than or equal to a diameter of the optically active surface that faces away from the light source. A distance parallel to the optical axis of the headlight lens within the meaning of the invention is in particular a distance in the direction of the optical axis.

A diameter of an optically active surface within the meaning of the invention is in particular a diameter of a perpendicular projection of said surface onto a plane orthogonal to the optical axis of the headlight lens.

In a further configuration of the invention, the lens rim is 1 mm to 10 mm, advantageously 2 mm to 6 mm, in particular approximately 3 mm, thick with respect to a direction parallel to the optical axis of the headlight lens.

In a further configuration of the invention, the ratio of a distance—parallel to the optical axis of the headlight lens—between a position at the edge of the optically active surface that is to face the light source and the midpoint of the optically active surface that is to face the light source or the (virtual) point of intersection between the optically active surface that is to face the light source and the optical axis of the headlight lens to the diameter of the optically active surface that is to face the light source, in particular with respect to a continuous or at least substantially continuous course of the optically active surface that is to face the light source, amounts to 0.01 to 0.2, advantageously 0.02 to 0.1, in particular approximately 0.08. This ratio corresponds e.g. to H1/D1 in accordance with FIG. 3.

In a further configuration of the invention, a distance —parallel to the optical axis of the headlight lens—between
- a position at the edge of the optically active surface that is to face the light source,
- the edge of the optically active surface that is to face the light source or
- a substantial part of the edge of the optically active surface that is to face the light source and
- a surface of the lens rim that is to face the light source amounts to 0.1 mm to 2 mm advantageously 0.1 mm to 0.5 mm, in particular approximately 0.3 mm. This distance corresponds e.g. to H3 in accordance with FIG. 3.

In a further configuration of the invention, the surface of the lens rim or at least a predominant or substantial part of the surface of the lens rim at the outer periphery of the lens rim runs substantially parallel to the optical axis of the headlight lens. In this sense, substantially parallel to the optical axis is intended to mean or comprise in particular an inclination relative to the optical axis of 3° to 8°, in particular 3° to 5°.

In one configuration, more than half of the optically active surface that is to face the light source and/or the optically active surface that faces away from the light source has a roughness of less than 0.1 µm, in particular less than 0.08 µm. Roughness within the meaning of the invention is to be defined in particular as $R_a$, in particular according to ISO 4287.

In a further configuration of the invention, the lens rim has a surface that is to face the light source and that projects, for example by a distance designated by H3 in FIG. 3, in the direction of the optical axis of the headlight lens beyond an edge of the optically active surface that is to face the light source or a part of the edge of the optically active surface that is to face the light source.

The aforementioned objects are additionally achieved by means of a headlight lens for a vehicle headlight comprising a light source, in particular for a motor vehicle headlight, the headlight lens comprising a lens body composed of a transparent material which is moulded (blank-pressed) on both sides and which comprises an optically active surface that is to face the light source and an optically active surface that faces away from the light source, the optically active surface that faces away from the light source being convexly curved, the optically active surface that is to face the light source being curved, in particular convexly or concavely, and the headlight lens comprising a lens rim externally on the optically active surface that is to face the light source.

An optically active surface is to be understood within the meaning of the invention to be in particular a desired "useful surface". An optically active surface is to be understood within the meaning of the invention to be in particular that part of a surface of the headlight lens by means of which the desired optical effect is obtained during use as intended.

The optically active surface that is to face the light source should be regarded as curved within the meaning of the invention in particular when the ratio
- of a distance—parallel to the optical axis of the headlight lens—between a position at the edge of the optically active surface that is to face the light source, between the edge of the optically active surface that is to face the light source or between a substantial part of the edge of the optically active surface that is to face the light source and the midpoint of the optically active surface that is to face the light source or the (virtual) point of intersection between the optically active surface that is to face the light source and the optical axis of the headlight lens to
- the diameter of the optically active surface that is to face the light source, in particular with respect to a continuous or at least substantially continuous course of the optically active surface that is to face the light source, amounts to at least 0.01, in particular at least 0.02.

In a further configuration of the invention, the proportion of the volume of the headlight lens made up by the volume of the lens rim amounts to 2% to 6%, in particular approximately 3%.

In one configuration of the invention, the optically active surface that is to face the light source and/or the optically active surface that faces away from the light source is round, in particular circular or substantially circular.

In a further configuration of the invention, a diameter of the optically active surface that is to face the light source is less than or equal to a diameter of the optically active surface that faces away from the light source. A distance parallel to the optical axis of the headlight lens within the meaning of the invention is in particular a distance in the direction of the optical axis.

A diameter of an optically active surface within the meaning of the invention is in particular a diameter of a perpendicular projection of said surface onto a plane orthogonal to the optical axis of the headlight lens.

In a further configuration of the invention, the lens rim is 1 mm to 10 mm, advantageously 2 mm to 6 mm, in particular approximately 3 mm, thick with respect to a direction parallel to the optical axis of the headlight lens.

In a further configuration of the invention, the ratio
- of a distance—parallel to the optical axis of the headlight lens—between a position at the edge of the optically active surface that is to face the light source and the midpoint of the optically active surface that is to face the light source or the (virtual) point of intersection between the optically active surface that is to face the light source and the optical axis of the headlight lens to
- the diameter of the optically active surface that is to face the light source, in particular with respect to a continuous or at least substantially continuous course of the optically active surface that is to face the light source, amounts to 0.01 to 0.2, advantageously 0.02 to 0.1, in particular approximately 0.08. This ratio corresponds e.g. to H1/D1 in accordance with FIG. 3.

In a further configuration of the invention, a distance —parallel to the optical axis of the headlight lens—between
- a position at the edge of the optically active surface that is to face the light source,
- the edge of the optically active surface that is to face the light source or
- a substantial part of the edge of the optically active surface that is to face the light source and
- a surface of the lens rim that is to face the light source amounts to 0.1 mm to 2 mm advantageously 0.1 mm to 0.5 mm, in particular approximately 0.3 mm. This distance corresponds e.g. to H3 in accordance with FIG. 3.

In a further configuration of the invention, the surface of the lens rim or at least a predominant or substantial part of the surface of the lens rim at the outer periphery of the lens rim runs substantially parallel to the optical axis of the headlight lens. In this sense, substantially parallel to the optical axis is intended to mean or comprise in particular an inclination relative to the optical axis of 3° to 8°, in particular 3° to 5°.

In a further configuration of the invention, the proportion of the volume of the headlight lens made up by the volume of the lens rim amounts to 1% to 8%, advantageously 2% to 6%, in particular approximately 3%.

In one configuration, more than half of the optically active surface that is to face the light source and/or the optically active surface that faces away from the light source has a roughness of less than 0.1 µm, in particular less than 0.08 µm. Roughness within the meaning of the invention is to be defined in particular as $R_a$, in particular according to ISO 4287.

The aforementioned objects are additionally achieved by means of a vehicle headlight comprising a headlight lens comprising one or more of the aforementioned features. In a configuration of the invention, the vehicle headlight comprises a light shield, an edge of the light shield being able to be imaged as a bright-dark boundary by means of the headlight lens.

The aforementioned objects are additionally achieved by means of a motor vehicle comprising a headlight lens comprising one or more of the aforementioned features or comprising a vehicle headlight comprising one or more of the aforementioned features. In a configuration of the invention, in this case the bright-dark boundary can be imaged onto a roadway on which the motor vehicle can be arranged.

Motor vehicle within the meaning of the invention is in particular a land vehicle which can be used individually in traffic. Motor vehicles within the meaning of the invention are in particular not restricted to land vehicles with an internal combustion engine.

DETAILED DESCRIPTION

Figure 1:
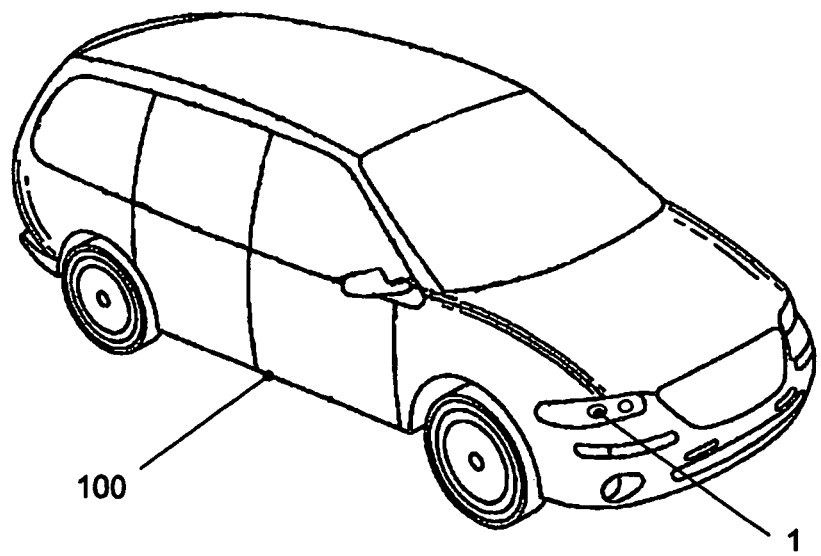
FIG. 1 shows a motor vehicle.
Figure 2:
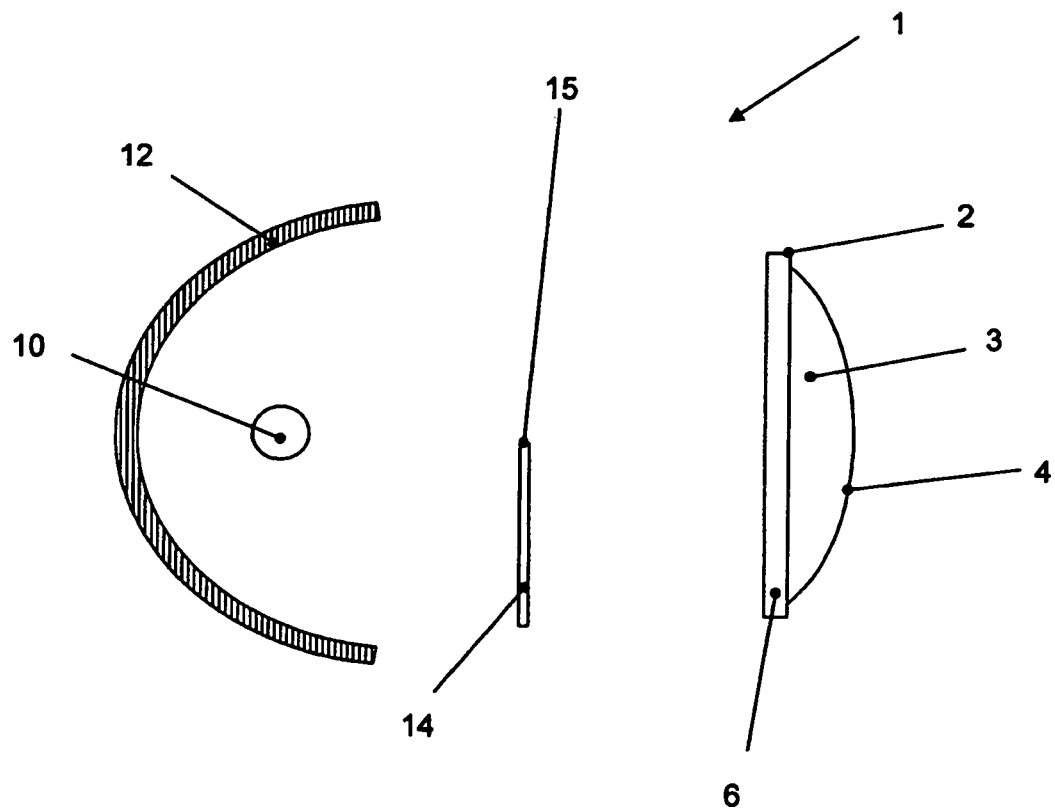
FIG. 2 shows a schematic illustration of a vehicle headlight.

FIG. 1 shows a motor vehicle 100 comprising a vehicle headlight 1, which is illustrated schematically in FIG. 2, comprising a light source 10 for generating light, a reflector 12 for reflecting light that can be generated by means of the light source 10, and a light shield 14. The vehicle headlight 1 additionally comprises a headlight lens 2 for altering the beam direction of light that can be generated by means of the light source 10, and for imaging an edge 15 of the light shield 14 as a bright-dark boundary.

Figure 3:
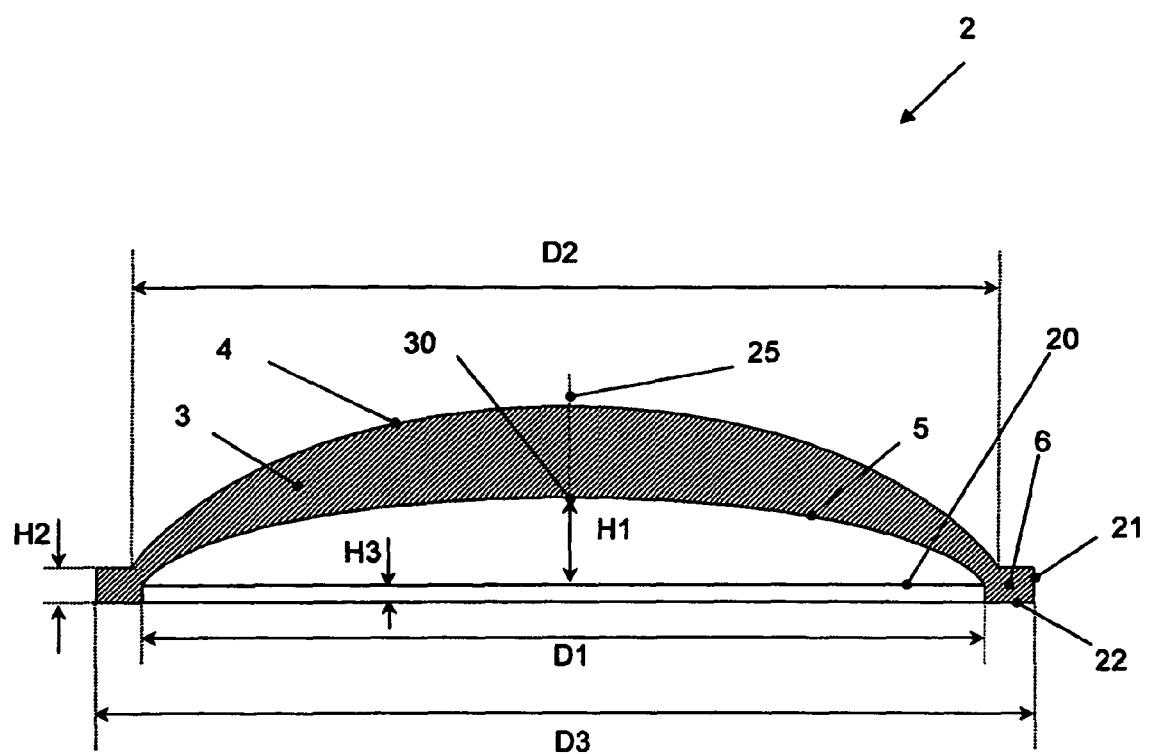
FIG. 3 shows a cross section of one exemplary embodiment of a headlight lens.
Figure 4:
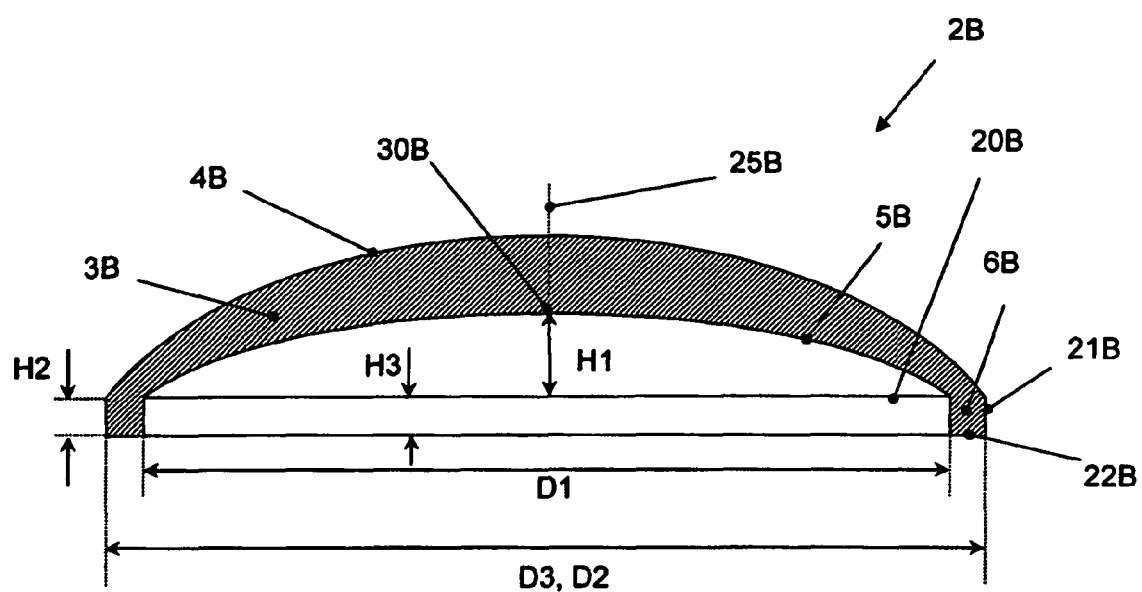
FIG. 4 shows a cross section of a further exemplary embodiment of a headlight lens.
Figure 5:
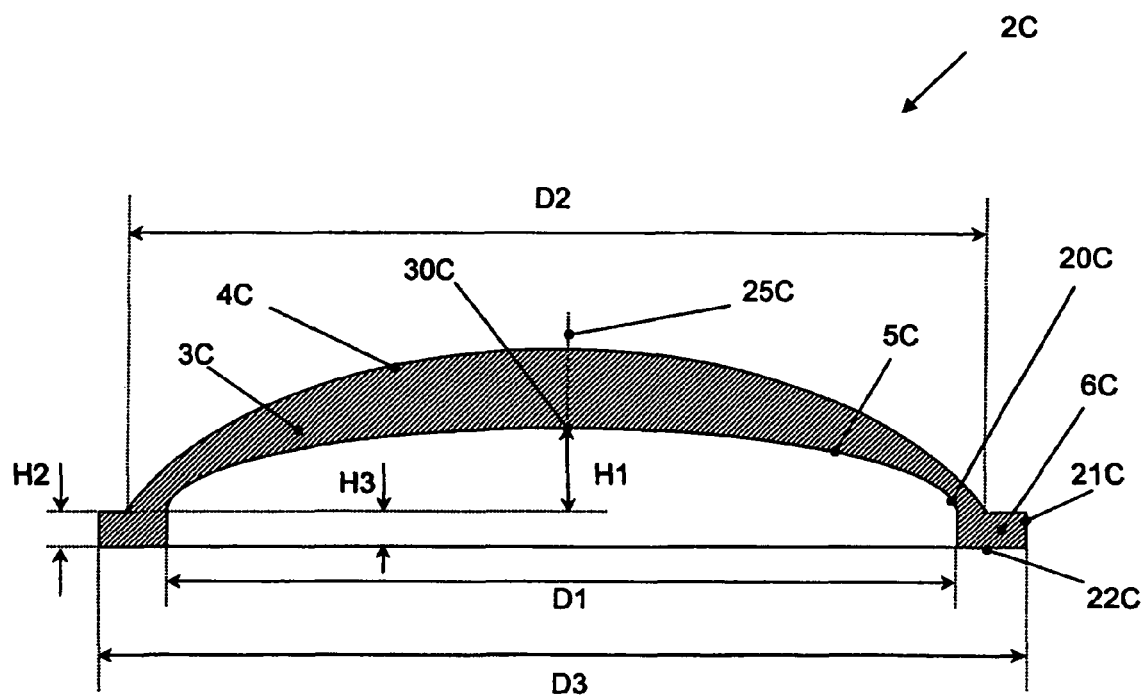
FIG. 5 shows a cross section of a further exemplary embodiment of a headlight lens.
Figure 6:
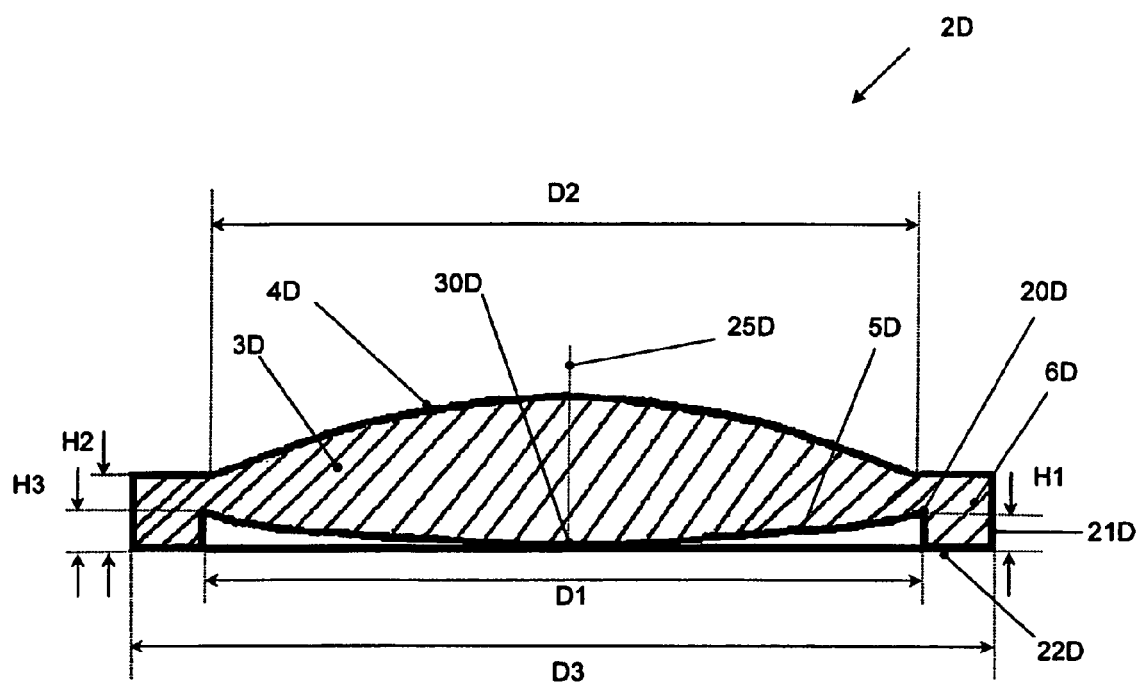
FIG. 6 shows a cross section of a further exemplary embodiment of a headlight lens.
Figure 7:
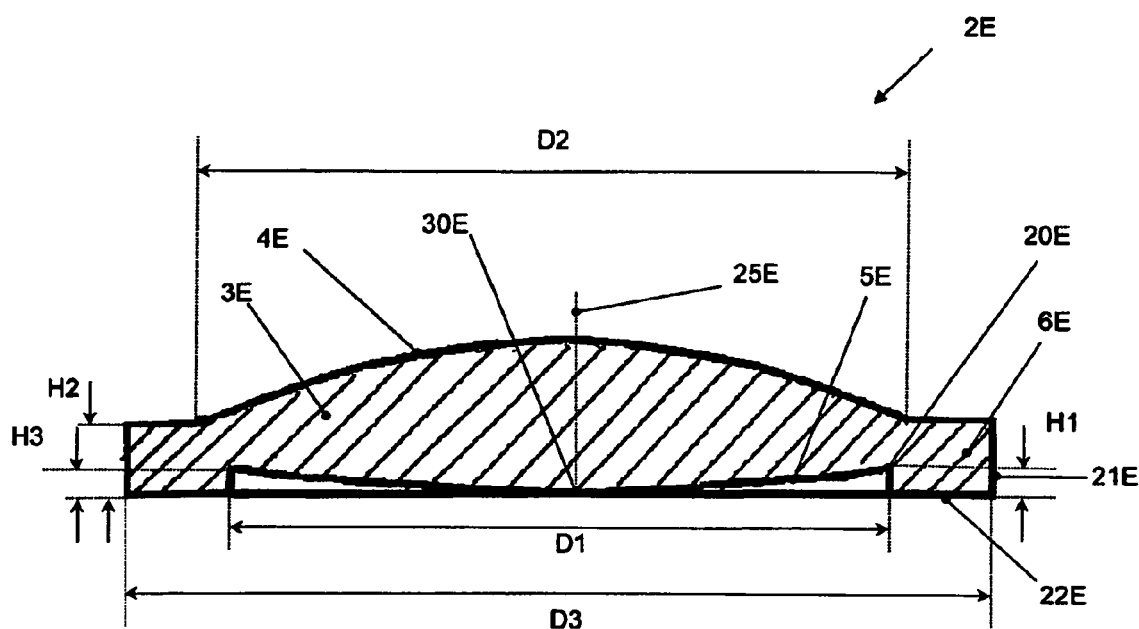
FIG. 7 shows a cross section of a further exemplary embodiment of a headlight lens.
Figure 8:
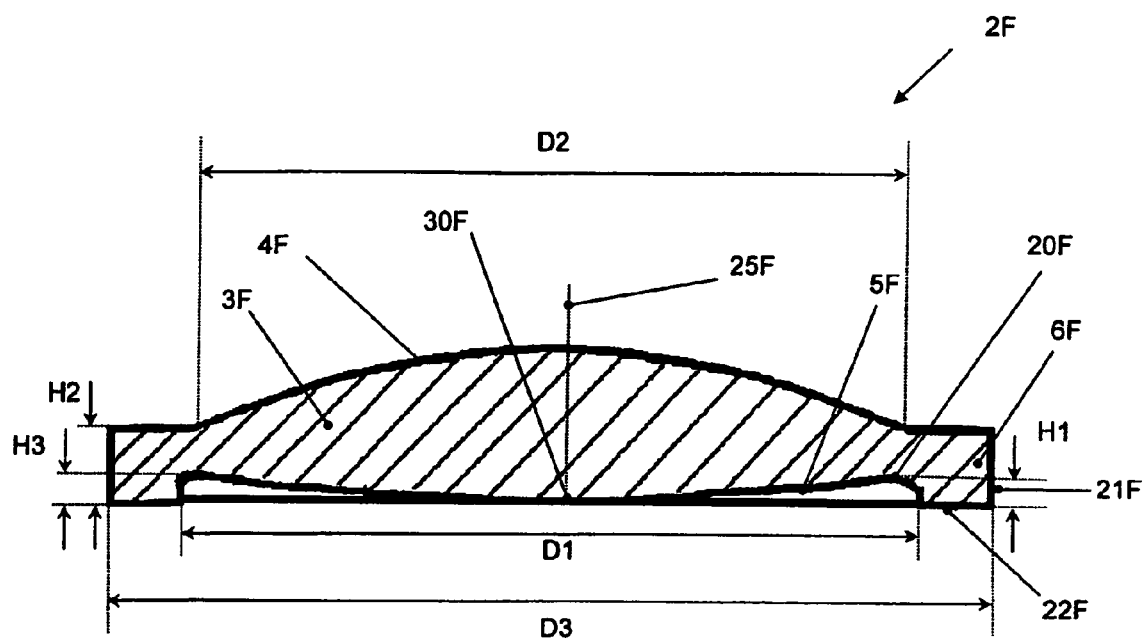
FIG. 8 shows a cross section of a further exemplary embodiment of a headlight lens.

FIG. 3 shows a cross section of the headlight lens 2 along its optical axis 25. FIG. 4, FIG. 5, FIG. 6, FIG. 7 and FIG. 8 show further exemplary embodiments of headlight lenses 2B, 2C, 2D, 2E and 2F, respectively, for use instead of the headlight lens 2 in the vehicle headlight 1, identical reference symbols designating identical distances.

The headlight lenses 2, 2B, 2C, 2D, 2E and 2F each comprise a lens body 3, 3B, 3C, 3D, 3E and 3F, respectively, composed of a transparent material, such as e.g. glass, which is moulded (blank-pressed) on both sides and which comprises an optically active surface 5, 5B, 5C, 5D, 5E and 5F respectively, that is to face the light source 10 and an optically active surface 4, 4B, 4C, 4D, 4E and 4F respectively that faces away from the light source 10. The respective optically active surface 4, 4B, 4C, 4D, 4E and 4F of the headlight lenses 2, 2B, 2C, 2D, 2E and 2F, respectively, that faces away from the light source 10 is convexly curved. The respective optically active surface 5D, 5E and 5F of the headlight lenses 2D, 2E and 2F, respectively, that is to face the light source 10 is likewise convexly curved. The respective optically active surface 5, 5B and 5C of the headlight lenses 2, 2B and 2C, respectively, that is to face the light source 10 is convexly curved, by contrast.

The respective optically active surfaces 5, 5B, 5C, 5D, 5E and 5F of the headlight lenses 2, 2B, 2C, 2D, 2E and 2F that are to face the light source 10 are in this case curved in such a way that the ratio H1/D1 of a distance H1—parallel to the optical axis of the headlight lens—between the respective edge 20, 20B, 20C, 20D, 20E and 20F of the optically active surface 5, 5B, 5C, 5D, 5E and 5F that is to face the light source 10 and the midpoint 30, 30B, 30C, 30D, 30E and 30F, respectively, of the respective optically active surface 5, 5B, 5C, 5D, 5E and 5F that is to face the light source 10 or the (virtual) point 30, 30B, 30C, 30D, 30E and 30F, respectively, of intersection between the respective optically active surface 5, 5B, 5C, 5D, 5E and 5F that is to face the light source 10 and the optical axis 25, 25B, 25C, 25D and 25F, respectively, of the headlight lenses 2, 2B, 2C, 2D, 2E and 2F, respectively to the diameter D1 of the respective optically active surface 5, 5B, 5C, 5D, 5E and 5F that is to face the light source 10 amounts to 0.01 to 0.2, advantageously 0.02 to 0.1, in particular approximately 0.08.

The headlight lenses 2, 2B, 2C, 2D, 2E and 2F each comprise a respective lens rim 6, 6B, 6C, 6D, 6E and 6F on the outside or at the edge 20, 20B, 20C, 20D, 20E and 20F, of the respective optically active surfaces 5, 5B, 5C, 5D, 5E and 5F that are to face the light source 10. The respective lens rim 6, 6B, 6C, 6D, 6E and 6F has in each case at least one surface 22, 22B, 22C, 22D, 22E and 22F, respectively, that is to face the light source 10 and that projects in the direction of the respective optical axis 25, 25B, 25C, 25D, 25E and 25F of the headlight lenses 2, 2B, 2C, 2D, 2E and 2F, respectively, beyond the respective edge 20, 20B, 20C, 20D, 20E and 20F of the respective optically active surface 5, 5B, 5C, 5D, 5E and 5F that is to face the light source 10. In this case, the distance H3—parallel to the respective optical axis 25, 25B, 25C, 25D, 25E and 25F of the headlight lenses 2, 2B, 2C, 2D, 2E and 2F, respectively—between the respective edge 20, 20B, 20C, 20D, 20E and 20F of the optical active surfaces that are to face the light source 10 and the respective surfaces 22, 22B, 22C, 22D, 22E and 22F of the lens rims 6, 6B, 6C, 6D, 6E and 6F, respectively, that are to face the light source 10 amounts to 0.1 mm to 2 mm, advantageously 0.1 mm to 0.5 mm, in particular approximately 0.3 mm.

The lens rims 6, 6B, 6C, 6D, 6E and 6F have—with respect to a direction parallel to the respective optical axis 25, 25B, 25C, 25D, 25E and 25F of headlight lenses 2, 2B, 2C, 2D, 2E and 2F, respectively —a thickness H2 of 1 mm to 10 mm, advantageously 2 mm to 6 mm, in particular approximately 3 mm. The difference between the external diameter D3 of a respective headlight lens 2, 2B, 2C, 2D, 2E and 2F and the diameter D1 of the respective optically active surface 5, 5B, 5C, 5D, 5E and 5F that is to face the light source 10 amounts to 0.5 mm to 10 mm, in particular approximately 2 mm. The difference between the external diameter D3 of a respective headlight lens 2, 2B, 2C, 2D, 2E, and 2F and the diameter D1 of the respective optically active surface 4, 4B, 4C, 4D, 4E and 4F that faces away from the light source 10 amounts to 0 mm to 5 mm, in particular approximately 2 mm to 3 mm. In this case, the thickness H2, the distance H3—parallel to the respective optical axis 25, 25B, 25C, 25D, 25E and 25F of the headlight lenses 2, 2B, 2C, 2D, 2E, and 2F—between the respective edge 20, 20B, 20C, 20D, 20E and 20F of the optically active surface that is to face the light source 10 and the surface 22, 22B, 22C, 22D, 22E and 22F, respectively, of the respective lens rim 6, 6B, 6C, 6D, 6E and 6F that is to face the light source 10, the difference between the external diameter D3 of the respective headlight lens 2, 2B, 2C, 2D, 2E, and 2F and the diameter D1 of the respective optically active surface 5, 5B, 5C, 5D, 5E and 5F that is to face the light source 10, and the difference between the external diameter D3 of the respective headlight lens 2, 2B, 2C, 2D, 2E, and 2F and the diameter D2 of the respective optically active surface 4, 4B, 4C, 4D, 4E and 4F that faces away from the light source 10, are related to one another in such a way that the proportion of the volume of the respective headlight lens 2, 2B, 2C, 2D, 2E, and 2F that is made up by the volume of the respective lens rim 6, 6B, 6C, 6D, 6E and 6F is 1% to 8%, advantageously 2% to 6%, in particular approximately 3%.

The surfaces 21, 21B, 21C, 21D, 21E, and 21F on the outer periphery of the lens rims 6, 6B, 6C, 6D, 6E and 6F respectively are inclined relative to the respective optical axis 25, 25B, 25C, 25D, 25E and 25F by 3° to 8°, in particular 3° to 5°.

The transition between the optically active surfaces 5, 5B, 5D, and 5E of the headlight lenses 2, 2B, 2D, and 2E respectively, that are to face the light source 10 and the corresponding lens rims 6, 6B, 6D, and 6E is configured as a bend. By contrast, the first derivative of the transition between the optically active surfaces 5C and 5F of the headlight lenses 2C and 2F that are to face the light source 10 and the corresponding lens rims 6C and 6F is continuous.

The elements, dimensions, angles and area relationships in the figures are depicted taking account of simplicity and clarity and not necessarily as true to scale. Thus, by way of example, the orders of magnitude of some elements, dimensions, angles and area relationships are represented in exaggerated fashion relative to other elements, dimensions, angles and area relationships, in order to improve the understanding of the exemplary embodiments of the present invention.

The invention claimed is:

1. A vehicle headlight comprising a light source; a light shield, the light shield having an edge; and a headlight lens configured for imaging the edge of the light shield as a bright-dark boundary, the headlight lens being composed of a glass and comprising:

a molded optically active surface facing the light source, the optically active surface for facing the light source being concavely curved;

a molded optically active surface for facing away from the light source, the optically active surface for facing away from the light source being convexly curved; and a lens rim of a volume amounting to 1% to 8% of the volume of the headlight lens.

2. The headlight according to claim 1, wherein a diameter of the optically active surface for facing the light source is less than or equal to a diameter of the optically active surface for facing away from the light source.

3. The headlight according to claim 1, wherein the lens rim is 1 mm to 10 mm thick with respect to a direction parallel to the optical axis of the headlight lens.

4. The headlight according to claim 1, wherein the ratio of a—parallel to the optical axis of the headlight lens—distance between a position at the edge of the optically active surface for facing the light source and the midpoint of the optically active surface for facing the light source or the point of intersection between the optically active surface for facing the light source and the optical axis of the headlight lens to the diameter of the optically active surface for facing the light source amounts to 0.01 to 0.2.

5. The headlight according to claim 1, wherein the ratio of a—parallel to the optical axis of the headlight lens—distance between one of the group of (a) the edge of the optically active surface for facing the light source and (b) a substantial part of the edge of the optically active surface for facing the light source and one of the group of (a) the midpoint of the optically active surface for facing the light source and (b) a virtual point of intersection between the optically active surface for facing the light source and the optical axis of the headlight lens to the diameter of the optically active surface for facing the light source amounts to 0.02 to 0.1.

6. The headlight according to claim 1, wherein a—parallel to the optical axis of the headlight lens—distance between one of the group of (a) a position at the edge of the optically active surface for facing the light source, (b) the edge of the optically active surface for facing the light source or (c) a substantial part of the edge of the optically active surface for facing the light source and a surface of the lens rim for facing the light source amounts to 0.1 mm to 2 mm.

7. The headlight according to claim 1, wherein a predominant part of the surface of the lens rim at the outer periphery of the lens rim runs substantially parallel to the optical axis of the headlight lens.

8. The headlight according to claim 1, the lens rim having a surface for facing the light source and projecting in the direction of the optical axis of the headlight lens beyond an edge of the optically active surface for facing the light source or a part of the edge of the optically active surface for facing the light source.

9. A vehicle headlight comprising:

a light source a light shield, the light shield having an edge; and a headlight lens configured for imaging the edge of the light shield as a bright-dark boundary, the headlight lens being composed of a glass and comprising:

a molded optically active surface facing the light source, the optically active surface facing the light source being convexly curved;

a molded optically active surface facing away from the light source, the optically active surface facing away from the light source being convexly curved; and a lens rim of a volume amounting to 1% to 8% of the volume of the headlight lens.

10. The headlight according to claim 9, wherein a diameter of the optically active surface facing the light source is less than or equal to a diameter of the optically active surface facing away from the light source.

11. The headlight according to claim 9, wherein the lens rim is 1 mm to 10 mm thick with respect to a direction parallel to the optical axis of the headlight lens.

12. The headlight according to claim 9, wherein the ratio of a—parallel to the optical axis of the headlight lens—distance between a position at the edge of the optically active surface facing the light source and the midpoint of the optically active surface facing the light source or the point of intersection between the optically active surface facing the light source and the optical axis of the headlight lens to the diameter of the optically active surface facing the light source amounts to 0.01 to 0.2.

13. The headlight according to claim 9, wherein the ratio of a—parallel to the optical axis of the headlight lens—distance between one of the group of (a) the edge of the optically active surface facing the light source and (b) a substantial part of the edge of the optically active surface facing the light source and one of the group of (a) the midpoint of the optically active surface facing the light source and (b) a virtual point of intersection between the optically active surface facing the light source and the optical axis of the headlight lens to the diameter of the optically active surface facing the light source amounts to 0.02 to 0.1.

14. The headlight according to claim 9, wherein a—parallel to the optical axis of the headlight lens—distance between one of the group of (a) a position at the edge of the optically active surface facing the light source, (b) the edge of the optically active surface facing the light source or (c) a substantial part of the edge of the optically active surface facing the light source and a surface of the lens rim facing the light source amounts to 0.1 mm to 2 mm.

15. The headlight according to claim 9, wherein a predominant part of the surface of the lens rim at the outer periphery of the lens rim runs substantially parallel to the optical axis of the headlight lens.

16. The headlight according to claim 9, the lens rim having a surface facing the light source and projecting in the direction of the optical axis of the headlight lens beyond an edge of the optically active surface facing the light source or a part of the edge of the optically active surface facing the light source.

* * * * *